United States Patent
Matsui

(10) Patent No.: US 6,511,570 B2
(45) Date of Patent: Jan. 28, 2003

(54) METHOD FOR PRODUCING BODY STRUCTURE OF FIBER-REINFORCED COMPOSITE, AND BODY STRUCTURE PRODUCED THEREBY

(75) Inventor: Nobuo Matsui, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 63 days.

(21) Appl. No.: 09/842,160

(22) Filed: Apr. 26, 2001

(65) Prior Publication Data

US 2001/0035251 A1 Nov. 1, 2001

(30) Foreign Application Priority Data

Apr. 27, 2000 (JP) .......................... 2000-128389

(51) Int. Cl.⁷ ............................................. B32B 31/00
(52) U.S. Cl. ...................... 156/245; 156/297; 428/172; 244/119
(58) Field of Search ................ 156/242, 245, 156/297, 500; 428/119, 172; 244/119

(56) References Cited

U.S. PATENT DOCUMENTS

| | | | |
|---|---|---|---|
| 5,242,523 A | | 9/1993 | Willden et al. .............. 156/285 |
| 5,451,377 A | * | 9/1995 | Asher et al. ................. 428/167 |
| 5,622,733 A | * | 4/1997 | Asher et al. ................. 425/504 |
| 5,746,553 A | * | 5/1998 | Engwall ...................... 409/132 |
| 5,876,546 A | * | 3/1999 | Cloud .......................... 156/212 |
| 6,364,250 B1 | * | 4/2002 | Brink et al. ................. 244/119 |

FOREIGN PATENT DOCUMENTS

EP 0 650 825 A1 5/1995

OTHER PUBLICATIONS

Patent Abstracts of Japan, JP 05 008316, Jan. 19, 1993.
European Search Report for EP 01 30 3876.

\* cited by examiner

*Primary Examiner*—James Sells
(74) *Attorney, Agent, or Firm*—Sughrue Mion, PLLC

(57) ABSTRACT

A method for producing a body structure composed of a stiffened panel of a fiber-reinforced composite, wherein (a) a skin member is placed on a forming tool, (b) a plurality of preformed stringer members are arranged on the skin member at predetermined intervals, (c) a plurality of preformed outer frame members are arranged on the skin member to intersect the preformed stringer members, (d) the skin member, the preformed stringer members and the preformed outer frame members are integrally hardened by heating under a pressure to prepare an assembly having a skin, stringers and an outer frame, (e) an inner frame member hardened by heating under a pressure beforehand is put into contact with the outer frame, and (f) the inner frame member and the assembly are adhesive-formed by heating under a pressure. A body structure produced by the method is also provided.

5 Claims, 5 Drawing Sheets

METHOD FOR PRODUCING BODY STRUCTURE OF FIBER-REINFORCED COMPOSITE, AND BODY STRUCTURE PRODUCED THEREBY

BACKGROUND OF THE INVENTION

The present invention relates to a method for producing a body structure composed of a stiffened panel of a fiber-reinforced composite, and a body structure produced by the method.

Fiber-reinforced composites (prepregs) are light in weight and high in strength to have been widely used for automobiles, ships, aircrafts, etc. Although most of conventional aircrafts made of the fiber-reinforced composites have a body structure composed of honeycomb sandwich panels, the body structure is preferably composed of integrally formed, stiffened panels to obtain a lighter aircraft with improved reliability. The stiffened panel, in particular, such that a skin and stiffeners are integrally formed, is the most suitable for production of lightened body structure.

FIG. 1 is a partial, schematic perspective view showing an example of the body structure composed of the stiffened panel. The body structure 1 shown in FIG. 1 comprises a skin 2, shorter stringers 3 placed in lengthening direction, and taller frames 4 placed in circumferential direction. The stringers 3 and the frames 4 are simply shown in a quadrangular prism shape, they often having a section of C-shape, I-shape, J-shape, T-shape, etc. in practical. Such a body structure is generally produced by the steps of: placing a skin member and stiffener members (preformed stringer members and preformed frame members) made of a fiber-reinforced composite on a forming tool; and adhesive-forming them by heating under a pressure using a pressure bag, etc.

Intersections of the preformed stringer members and the preformed frame members are appropriately worked. As shown in FIG. 2, a body structure for a large aircraft is generally obtained by providing an open hole 51 in a preformed frame member 41, and by making a preformed stringer member 31 pass through the open hole 51 on a skin member 21. However, providing such an open hole increases production cost of the body structure. Particularly, in the case of a body structure for a small aircraft, height of the preformed frame member is approximately 50 mm to secure a desired interior space in contrast with the large aircraft having a frame height of approximately 100 mm, so that it is difficult to provide the open hole in the preformed frame member, thereby increasing the production cost.

OBJECT AND SUMMARY OF THE INVENTION

An object of the present invention is to provide a method for steadily producing a body structure composed of a stiffened panel of a fiber-reinforced composite with superior quality and reduced production cost, and a body structure produced thereby.

As a result of intensive research in view of the above object, the inventor has found that a body structure of superior quality can be produced with reduced production cost if a frame member is divided into an outer frame member and an inner frame member, the outer frame member being integrally formed with a skin member and a stringer member to prepare an assembly, and the inner frame member being adhesive-formed with the assembly. The present invention has been accomplished by the finding.

Thus, in a method for producing a body structure of a fiber-reinforced composite according to the present invention, a skin member, a plurality of preformed stringer members, a plurality of preformed outer frame members and an inner frame member each made of a fiber-reinforced composite are used, and (a) the skin member is placed on a forming tool, (b) the preformed stringer members are arranged on the skin member at predetermined intervals, (c) the preformed outer frame members are arranged on the skin member to intersect the preformed stringer members, (d) the skin member, the preformed stringer members and the preformed outer frame members are integrally hardened by heating under a pressure to prepare an assembly having a skin, stringers and an outer frame, (e) the inner frame member hardened by heating under a pressure beforehand is put into contact with the outer frame, and (f) the inner frame member and the assembly are adhesive-formed by heating under a pressure.

In the method of the present invention, the preformed stringer members pass through spaces between the preformed outer frame members and the inner frame member, so that there is no need to provide the above-described open hole. Further, dimensional error of the preformed outer frame members and the inner frame member can be absorbed when they are adhesive-formed, whereby a body structure excellent in dimensional accuracy can be produced with high reliability.

The preformed outer frame members preferably have a T-shaped section, and the inner frame member preferably has an L-shaped section. The L-shaped inner frame member can be formed and placed easier than a member of C-shape, J-shape, etc., thereby reducing production cost and steadying quality of the body structure. Further, it is preferred that the inner frame member is a seamless ring in shape from the viewpoint of strength of the body structure.

The inner frame member is preferably hardened by heating at 120 to 250° C. under a pressure beforehand, the skin member, the preformed stringer members and the preformed outer frame members are preferably integrally hardened by heating at 120 to 250° C. under a pressure, and the inner frame member and the assembly are preferably adhesive-formed by heating at 120 to 180° C. under a pressure.

A body structure of the present invention can be produced by the method according to the present invention mentioned above.

DETAILED DESCRIPTION OF THE PREFERRED EMBODIMENTS

Method for Producing Body Structure

Figure 1:
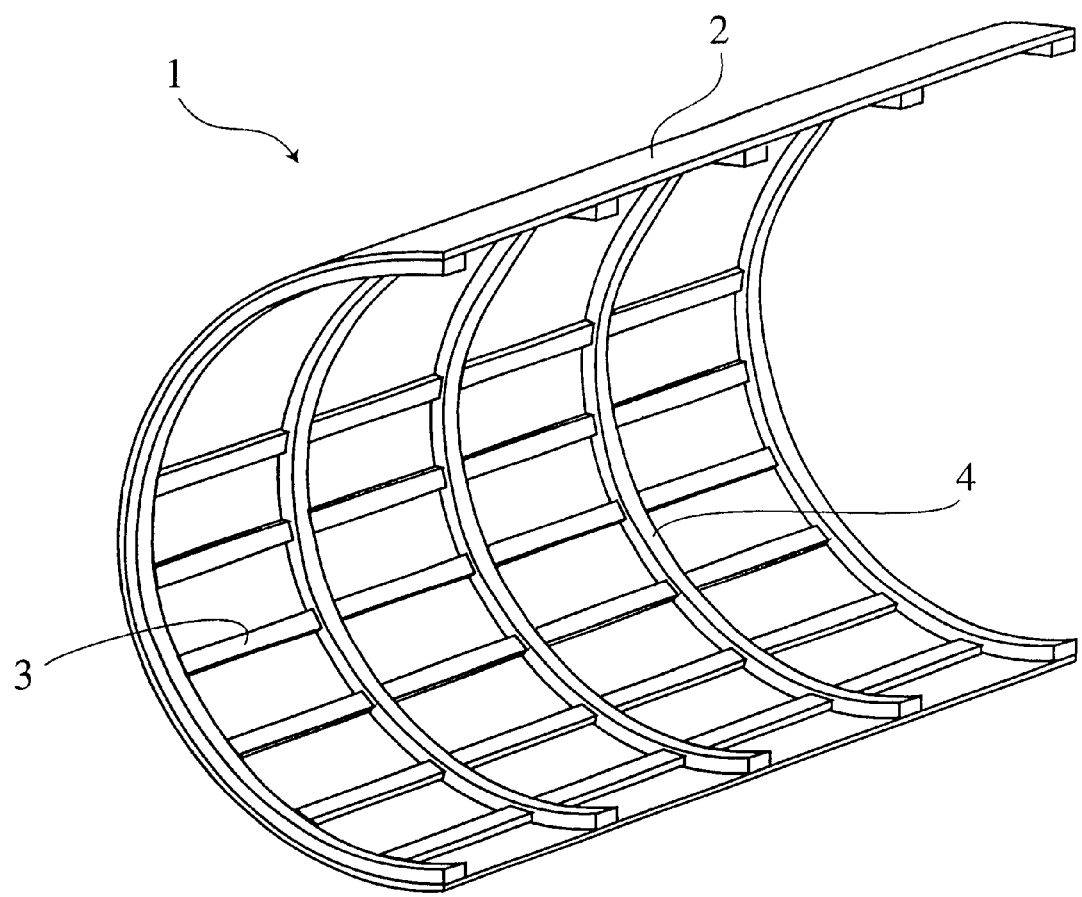
FIG. 1 is a partial, schematic perspective view showing an example of body structures composed of stiffened panels.
Figure 2:
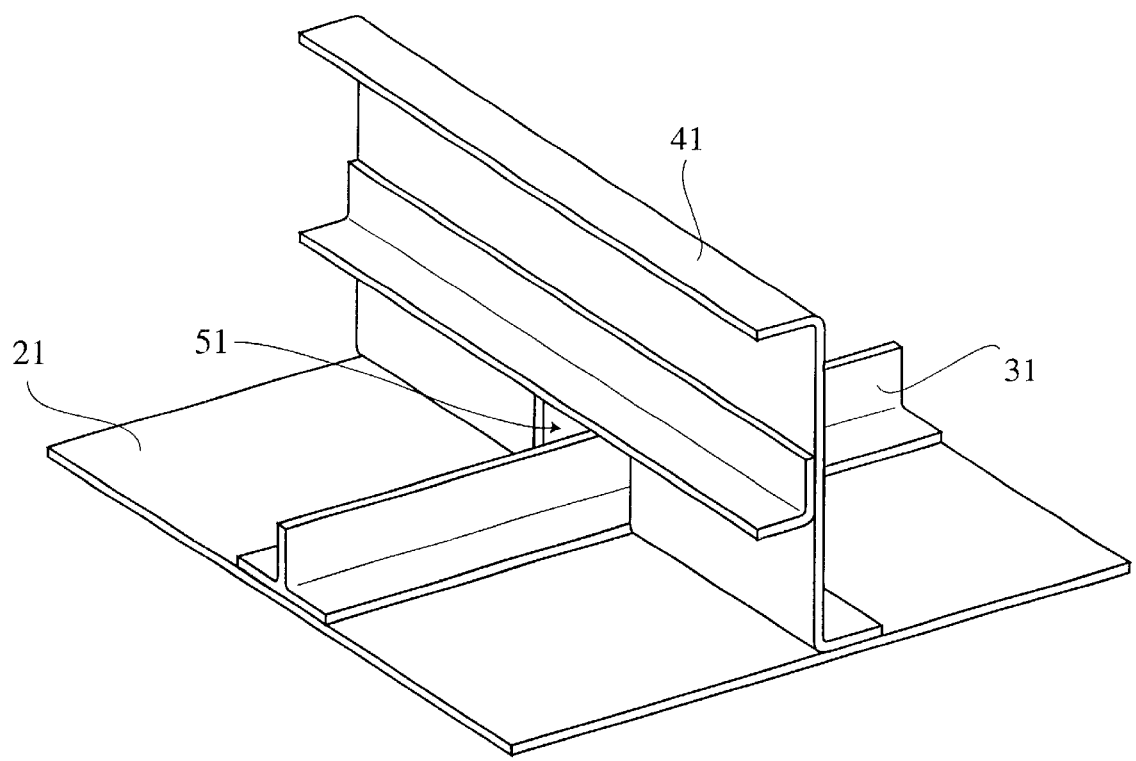
FIG. 2 is a partial perspective view showing an example of producing a conventional body structure.

A method for producing a body structure of fiber-reinforced composite according to the present invention uses a skin member, a plurality of preformed stringer members, a plurality of preformed outer frame members and an inner frame member each made of a fiber-reinforced composite.

In the present invention, the fiber-reinforced composite may be a woven fabric of such a reinforcing fiber as a carbon fiber, a glass fiber, an aramid fiber, etc. impregnated with a thermosetting resin or a thermoplastic resin. The thermosetting resin may be an epoxy resin, a bismaleimide resin, a phenol resin, etc., and the thermoplastic resin may be PEEK, nylon 6, nylon 66, polyethylene terephthalate, etc. Preferred as the thermosetting resin is an epoxy resin, and preferred as the thermoplastic resin is nylon. Ratio of the resin to the reinforcing fiber in the fiber-reinforced composite may be appropriately controlled. To the fiber-reinforced composite may be added an additive such as a hardening agent, etc. The skin member, the preformed stringer members, the preformed outer frame members and the inner frame member used in the present invention are preferably made of the same fiber-reinforced composite, although they may be made of different composites.

The preformed stringer members and the preformed outer frame members are preferably in a semi-hardened state. In the present invention, "semi-hardened state" means that the hardening degree of the fiber-reinforced composite is 5 to 20%. The semi-hardened members are preferably produced by a method comprising: the first process where a plurality of sheets made of the fiber-reinforced composite are laminated to each other, heated under a pressure, and cooled under a pressure to provide a flat plate-shaped laminate; the second process where the flat plate-shaped laminate is cut into a plate; and the third process where the plate is softened by heating, placed on a forming tool, and formed by cooling under a pressure.

The inner frame member is hardened by heating under a pressure beforehand by an autoclave, etc. Heating temperature is preferably 120 to 250° C. The heating temperature of more than 250° C. results in deterioration of the resin in the fiber-reinforced composite. On the other hand, when the heating temperature is less than 120° C., the resin is not sufficiently reacted. Further, the pressure is preferably 6 to 7 $kg/cm^2$. The pressure of more than 7 $kg/cm^2$ invites shortage of the resin, and the pressure of less than 6 $kg/cm^2$ often results in forming voids.

In the method for producing the body structure according to the present invention, (a) the skin member is placed on a forming tool, (b) the preformed stringer members are arranged on the skin member at predetermined intervals, (c) the preformed outer frame members are arranged on the skin member to intersect the preformed stringer members, (d) the skin member, the preformed stringer members and the preformed outer frame members are integrally hardened by heating under a pressure to prepare an assembly having a skin, stringers and an outer frame, (e) the inner frame member is put into contact with the outer frame, and (f) the inner frame member and the assembly are adhesive-formed by heating under a pressure.

Figure 3:
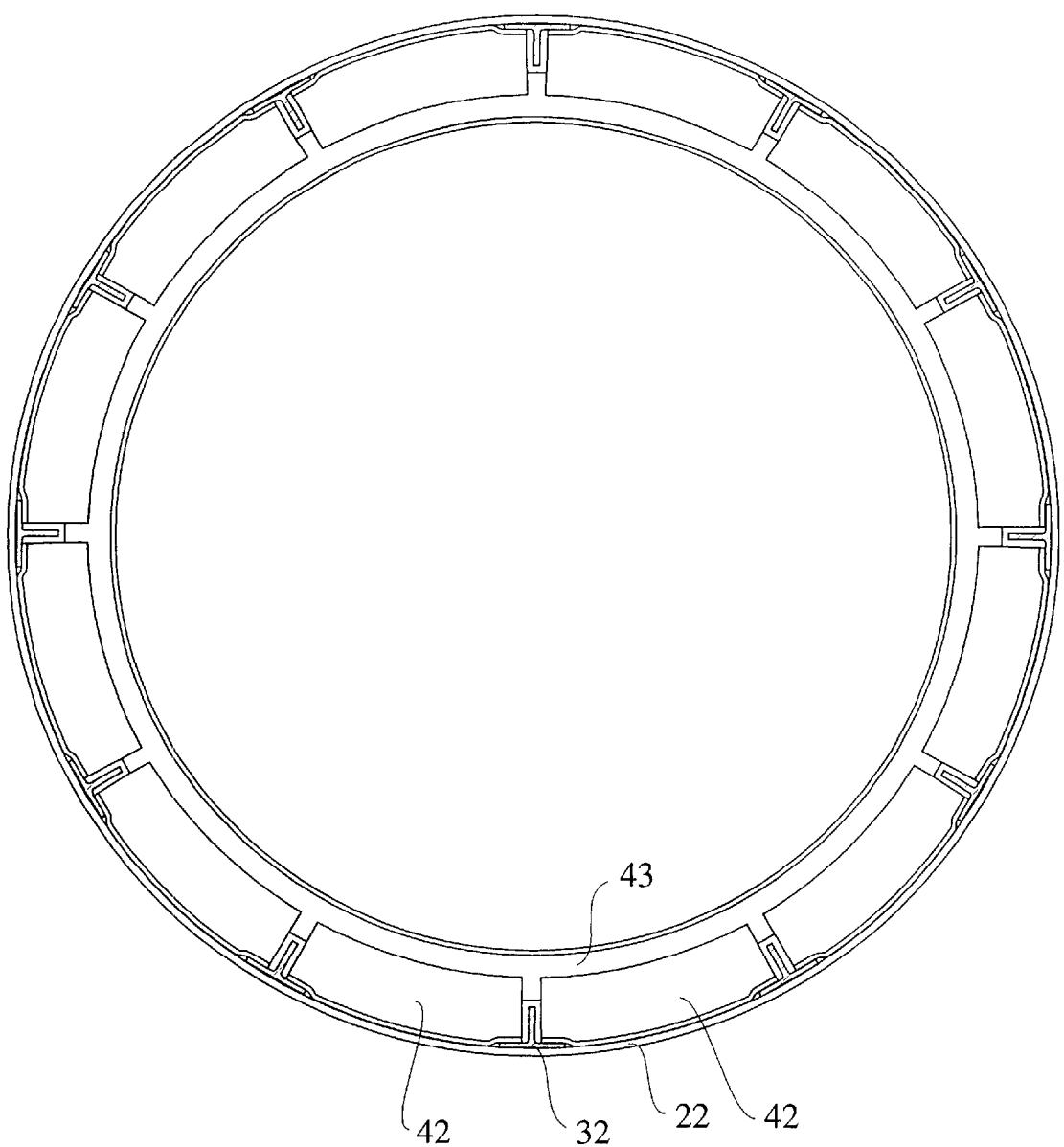
FIG. 3 is a front view showing an embodiment of producing a body structure by the method according to the present invention.
Figure 4:
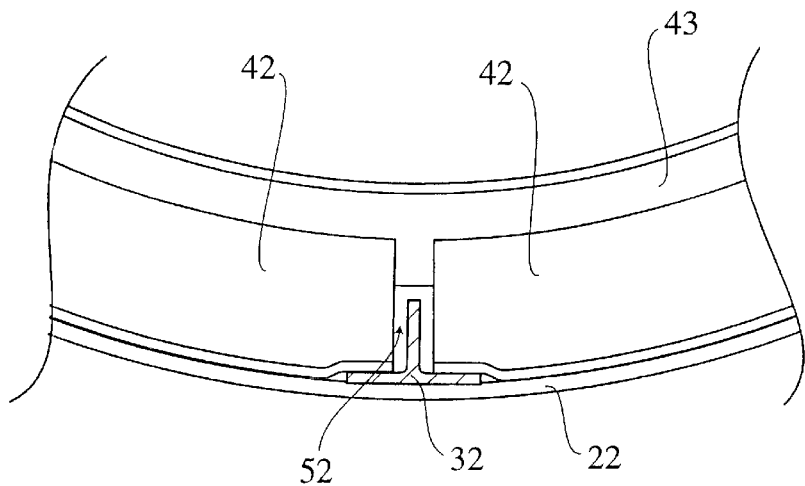
FIG. 4 is a partially enlarged view showing a portion of that shown in FIG. 3.
Figure 5:
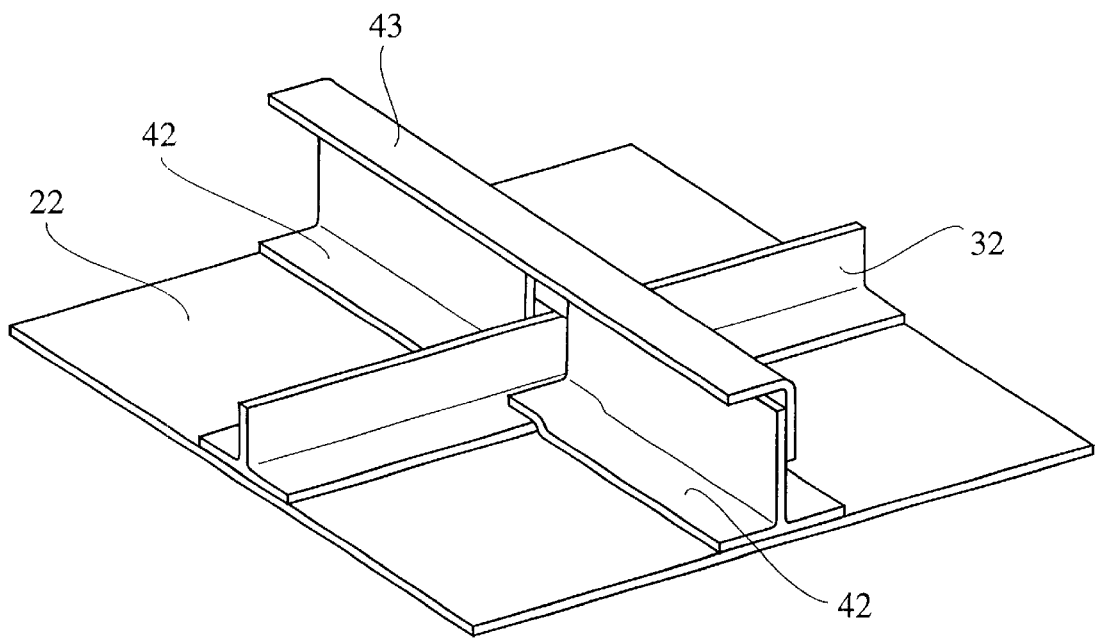
FIG. 5 is a partial perspective view showing a portion of that shown in FIG. 3.

FIG. 3 is a front view showing an embodiment of producing a body structure by the method according to the present invention, and FIGS. 4 and 5 are a partially enlarged view and a partial perspective view showing a portion of that shown in FIG. 3, respectively. Incidentally, each component shown in FIG. 5 may have a curved-shape, although it is simply shown in a plate shape therein. As shown in FIGS. 3 to 5, the body structure may be produced by the steps of: arranging preformed stringer members 32 and preformed outer frame members 42 on a skin member 22 placed on a forming tool (not shown); integrally hardening them to prepare an assembly; putting an inner frame member 43 into contact therewith; and adhesive-forming the inner frame member 43 and the assembly.

The preformed stringer member 32 pass through a space 52 between the preformed outer frame members 42 and the inner frame member 43. Thus, according to the present invention, there is no need to provide the above-described open hole in the frame members, thereby reducing production cost. Further, dimensional error of the preformed outer frame members and the inner frame member can be absorbed when they are adhesive-formed, whereby a body structure excellent in dimensional accuracy can be produced with high reliability.

The body structure is not limited to cylinder in shape, the method of the present invention being usable for production of body structures having a various shape such as elliptic cylinder, etc. The forming tool used in the present invention may be made of CFRP, a steel, aluminum, silicone rubber, etc.

The preformed stringer member used in the present invention may have a section of C-shape, I-shape, J-shape, etc. although the preformed stringer member 32 shown in FIGS. 3 to 5 has a T-shaped section. Further, the intervals and positional relationships between the preformed stringer members, and number of the preformed stringer members may be properly selected.

In FIGS. 3 to 5, the preformed outer frame member 42 has a T-shaped section, and a curved base having the same curvature as the entire body structure. In the both edge portions of the preformed outer frame member 42 is provided joggles. Though flange portion of the outer frame formed by the preformed outer frame members is divided by the stringers, the preformed outer frame members can be integrated with the preformed stringer members by the joggles to increase strength of the body structure. In contrast with the conventional, continuous frame member having the open hole, the shortly divided, preformed outer frame member used in the present invention can be produced and arranged on the skin member with ease. Therefore, the body structure can be automatically produced by the method of the present invention. The sectional shape of the preformed outer frame member is not particularly limited, and may be C-shape, I-shape, J-shape, etc., although the T-shaped, preformed outer frame member is preferably used in the present invention. Further, the intervals and positional relationships between the preformed outer frame members, and number of the members may be properly selected, being not limited to FIGS. 3 to 5.

The skin member, the preformed stringer members and the preformed outer frame members are integrally hardened by heating under a pressure to prepare the assembly. Heating is preferably carried out by an autoclave, etc. at 120 to 250° C. The heating temperature of more than 250° C. results in deterioration of the resin in the fiber-reinforced composite. On the other hand, when the heating temperature is less than 120° C., the resin is not sufficiently reacted. Further, the pressure is preferably 6 to 7 $kg/cm^2$. The pressure of more than 7 $kg/cm^2$ invites shortage of the resin, and the pressure of less than 6 $kg/cm^2$ often results in forming voids. The members may be integrally hardened while using a fixing mean such as a jig, a clamp, etc.

The inner frame member used in the present invention is particularly preferably a seamless ring in shape having an L-shaped section, like the inner frame member 43 shown in FIGS. 3 to 5. The L-shaped inner frame member can be formed and placed easier than a member of C-shape, J-shape, etc., thereby reducing production cost and steadying quality of the body structure.

The seamless ring shape is preferred from the viewpoint of strength of the body structure. In the case where the frame is not uniformly loaded, for example, the case of an elliptic cylinder-shaped body structure, height of the inner frame member may be appropriately controlled.

The inner frame member and the assembly are preferably adhesive-formed by heating at 120 to 180° C. under a pressure. Heating is preferably carried out by an oven or an autoclave. The heating temperature of more than 180° C. results in deterioration of the resin in the fiber-reinforced composite. On the other hand, when the heating temperature is less than 120° C., the resin is not sufficiently reacted. Further, the pressure is preferably 0.1 to 3.0 kg/cm². The pressure of more than 3.0 kg/cm² invites shortage of the resin. When the pressure is less than 0.1 kg/cm², gaps tend to be formed between the inner frame member and the assembly. The pressure is preferably applied by a clamp, a weight or air. The inner frame member and the assembly are preferably adhered by an epoxy adhesive paste or an epoxy adhesive film. The adhesive-forming may be carried out while using a jig, etc.

Figure 6:
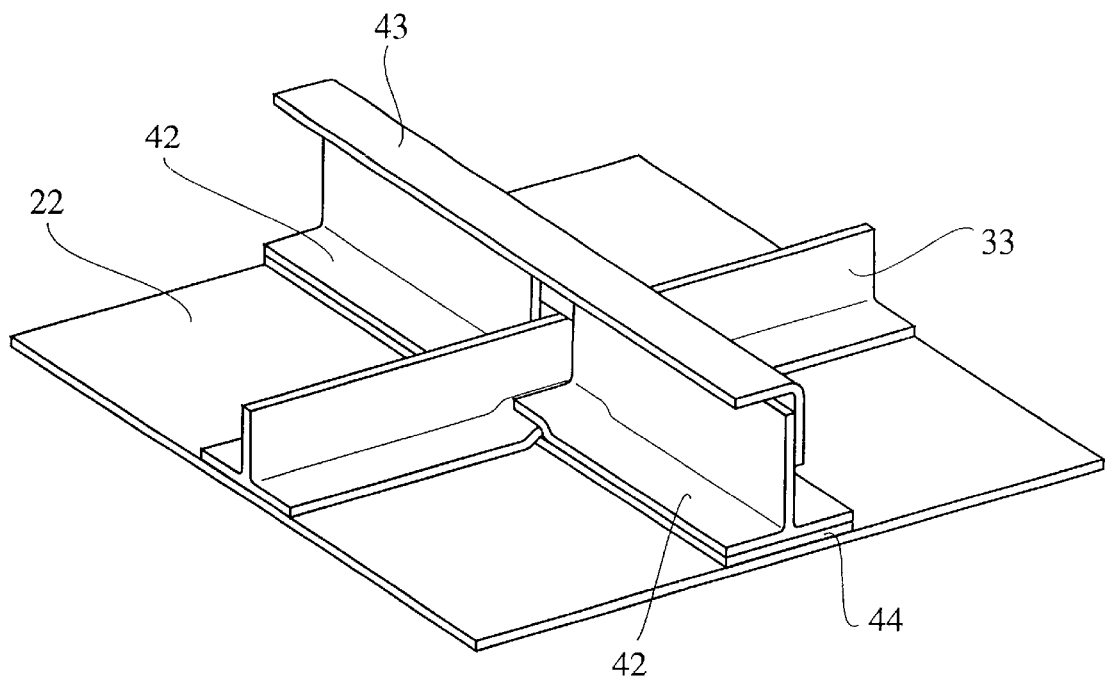
FIG. 6 is a partial perspective view showing another embodiment of producing a body structure by the method according to the present invention.

In the case of an elliptic cylinder-shaped body structure, to the frame is partially applied remarkably large load. In this case, it is thus preferred that a continuous, plate-shaped outer frame member 44 is provided between the skin member 22, and the preformed stringer member 33 and the preformed outer frame members 42, as shown in FIG. 6.

Body Structure

A body structure of the present invention can be produced by the method according to the present invention mentioned above. The body structure is usable for automobiles, ships, aircrafts, etc.

While the invention has been described with reference to FIGS. 1 to 6, it will be apparent to one skilled in the art that various changes and modifications can be made therein without departing from the spirit and scope thereof.

As described in detail above, according to a method of the present invention, a body structure composed of a stiffened panel of a fiber-reinforced composite can be steadily produced with reduced production cost. The produced body structure has superior quality. The body structure of the present invention is particularly preferably used for an aircraft body.

What is claimed is:

1. A method for producing a body structure, wherein a skin member, a plurality of preformed stringer members, a plurality of preformed outer frame members and an inner frame member each made of a fiber-reinforced composite are used, and (a) said skin member is placed on a forming tool, (b) said preformed stringer members are arranged on said skin member at predetermined intervals, (c) said preformed outer frame members are arranged on said skin member to intersect said preformed stringer members, (d) said skin member, said preformed stringer members and said preformed outer frame members are integrally hardened by heating under a pressure to prepare an assembly having a skin, stringers and an outer frame, (e) said inner frame member hardened by heating under a pressure beforehand is put into contact with said outer frame, and (f) said inner frame member and said assembly are adhesive-formed by heating under a pressure.

2. The method for producing a body structure according to claim 1, wherein said preformed outer frame members have a T-shaped section and said inner frame member has an L-shaped section.

3. The method for producing a body structure according to claim 1, wherein said inner frame member is a seamless ring in shape.

4. The method for producing a body structure according to claim 1, wherein said inner frame member is hardened by heating at 120 to 250° C. under a pressure beforehand, said skin member, said preformed stringer members and said preformed outer frame members are integrally hardened by heating at 120 to 250° C. under a pressure, and said inner frame member and said assembly are adhesive-formed by heating at 120 to 180° C. under a pressure.

5. A body structure obtained by the method recited in claim 1.

* * * * *